United States Patent Office 3,030,266

Patented Apr. 17, 1962

1

3,030,266
OILY BASE CONCENTRATE FOR ADMIXTURE INTO OIL PLANT SPRAY

Jean Cuille, Versailles, France, and Hubert Guyot, Basse-Terre, Guadeloupe, assignors to Agence de Representations Directes Pour la Defense des Interets Commerciaux, Dakar, Senegal, a corporation of France, and Usines Schloesing Freres & Cie, Marseille, France, a corporation of France No Drawing. Filed Dec. 3, 1957, Ser. No. 700,308
4 Claims. (Cl. 167—42)

This invention relates to compositions and methods for the spray application of fungicidal and insecticidal materials to trees and plants and, more particularly, to materials particularly adapted to dispersing fungicidal and insecticidal components in an oil spray for treating the leaves or foliage of various trees or other plants.

In recent years a technique of so-called "drift spraying" has been developed for the application of fungicidal and anti-parasite materials to the leaves or foliage of large tree planted areas to control, for example, the spread of plant diseases such as banana leaf-spot disease in large banana plantations, black pod disease in cocoa plants, anthracnose or rust in coffee plants, etc. Such drift spraying methods include forming a cloud or fog of fungicide or other treating material in a liquid carrier above the treetop level and with such regard to the velocity and direction of the prevailing wind that the cloud or fog will be carried over the orchard or plantation to settle upon the leaves or foliage. In many instances, satisfactory economies, such as in terms of the quantity of treating spray required per acre, the labor and equipment involved, etc., are achieved by the use of such drift spraying techniques as opposed to so-called "blast spraying" or directing a spray of fungicide directly to the foliage.

It has been found, however, in connection with such drift spraying techniques that the efficiency of treatment may be importantly a function of the droplet size of the spray or fog produced by the spraying apparatus, as well as of the carrying liquid, and whether the spray is an oil base or water base. For example, it is believed that the finer the spray or smaller the droplet size therein, the further the fog will travel from the generating point and the better the trees or plants will be covered. It has been suggested, for example, that droplets having a diameter of about 10 microns and falling from a height of about 3.5 meters will be carried perhaps 1500 meters by a wind of 4.5 kilometers per hour, whereas, by contrast, droplets having a diameter of 500 microns may be expected to be carried no more than about 2 meters under the same conditions. Similarly, the uniformity of coverage may be determined by the droplet size distribution, it having been suggested that, on the basis of a quantity of sprayed liquid calculated at about 11 liters per hectare, a dispersion of perhaps 1800 droplets per square millimeter will be achieved with 10 micron droplets whereas only about .015 droplet per square millimeter coverage is achieved with 500 micron droplets.

Furthermore, if it is desired to incorporate a solid or insoluble fungicidal or insecticidal material in the spray, difficulties may be encountered in maintaining an adequate and uniform suspension or dispersion of the solid material in the liquid carrier, both in the fog condition as well as to prevent settling out in the supply tank of the spray apparatus. Since it may be preferred to use oil as the liquid carrier, rather than water, to promote clinging of the droplets to the foliage being treated and/or to minimize leaching of the fungicide or interruption of treatment effect as by rain, such difficulties of maintaining a proper dispersion or suspension may be increased. It has also been found that, with an oil fog, liquid droplets ranging from 10 to 20 microns in size can be made to fall 50 to 100 meters away from the generating point from a height of perhaps 3 meters in from 5 to 6 minutes, whereas, by contrast, fungicide dusts or fumigants having a particle size of from 2 to 5 microns may take form in 1 to 7 hours to settle over the foliage of trees in an orchard or plantation.

2

According to this invention, then, fungicidal, insecticidal, or anti-parasite treating materials are produced in compositions which, when added to petroleum products or oils adapted for fogging or drift spraying application to the foliage of trees in an orchard or plantation, maintain the active ingredients adequately suspended in the oily carrier and enable the production and control of a fog or spray cloud having preferred droplet sizes for efficient application to a large planted area of an optimumly minimal quantity of material with a minimum of equipment and labor.

One object of this invention is to produce compositions of the character described for the introduction and dispersion of active treating materials in a liquid carrier for spray application to trees or plants over a large planted area.

Another object of this invention is to provide compositions of the character described for incorporation into a sprayable oily base to maintain dispersed therein active ingredients for fungicidal, insecticidal, or anti-parasite treatment of the foliage of trees in an orchard or plantation.

A further object of this invention is to provide compositions of the character described which, when admixed with sprayable oily liquid carriers, will adjust and control the surface tension and other characteristics of the admixture to provide for producing a fog or spray cloud comprising droplets having a uniform size distribution within preferred and optimum ranges.

Other objects and advantages of the invention will be apparent from the following description and the appended claims.

Although many types of spray and fog producing apparatus are adapted to atomize various liquids to varying and/or adjustable degrees, the actual droplet size distribution produced is, as will be understood, to a considerable extent a function of the surface tension and other characteristics of the liquid being atomized. For these reasons, among others, petroleum oils may be preferred as liquid carriers for a fungicidal material since a smaller droplet size may be produced which has a longer "carry" in the cloud of fog and allows for greater adherence of the carried fungicide to the leaf surface of the tree or plant being treated, as well as minimizing any leaching of the fungicide away from the leaf even if a heavy rain follows immediately after the spraying treatment. Nevertheless, the inherent surface tension and other characteristics of conventional petroleum oils adapted for orchard or plantation spraying may not give an optimum droplet size distribution in conventional apparatus and particularly when there is incorporated into the oil or spray a distinct fungicidal or insecticidal or anti-parasite active component. In cases where such active component is a solid and perhaps insoluble in the spraying oil, further difficulties may be experienced in attempting to achieve an optimum droplet size distribution for them because of the effect, among other reasons, of the suspended particles of solid in the oil at the point and moment of atomization, in addition to the difficulties inherent in maintaining a uniform suspension, without settling out, of solid in a liquid carrier passing through fogging or spraying or atomizing apparatus.

According to this invention, however, compositions are provided for including and admixing fungicidal or other active ingredients in a sprayable petroleum oil product to maintain their suspension therein despite passing through atomizing or fogging apparatus and which also so controls the surface tension and other pertinent characteristics of the final admixture that a preferred range of droplet size from 50 to 100 microns is achieved. Considering such a droplet size range, it may be noted that an average raindrop is of the order of 3000 microns and that one such drop can be broken up into 2700 droplets of 100 microns each, and that conventional fogging or atomizing apparatus will break up a gallon of spray, according to this invention, into approximately 8½ billion droplets of 100 microns in size, resulting in the efficient and satisfactory treatment utilizing no more than about two or three gallons of spray per acre.

According to this invention, a concentrate material is provided including the desired fungicide or insecticide or anti-parasite component and an oily base for maintaining the desired dispersion and controlling the desired characteristics of the overall mixture. Such a concentrate is admixed with conventional light mineral oil adapted for spraying trees within a range of approximately two gallons of mineral oil to two pints of concentrate, such as is described in more detail hereinafter. Such a mixture is then atomized or sprayed from conventional spraying or fogging apparatus with the nozzle thereof adjusted to produce droplets of a particle size within the range of 50 to 100 microns diameter, and the mixture sprayed from a generating point approximately 5 to 8 yards from the foliage to be treated with due regard to wind direction, velocity, etc.

A preferred mineral oil is that conventionally manufactured and sold by the Standard Oil Company for spraying orchards and known as "Esso Orchard Spray Oil." It is understood to be essentially a petroleum mineral oil having an unsulfonated residue content high enough to preclude scorching, a viscosity high enough to give a fairly stable suspension of a fungicide but still low enough to permit a high degree of atomization, and a reasonable volatility so that evaporation of the oil carrier from the leaf surface can be expected within about 72 hours. Such oil, in addition to the advantages above noted regarding increased adherence of the fungicide to the leaf surface, has a fungistatic effect which is believed to stop growth of the fungus, and possibly fruiting or sporing thereof, immediately after the first application, thus enhancing the efficiency of the fungicidal activity of the active component as compared with conventional control methods using Bordeaux or other aqueous copper materials where as much as a month may pass before a fungus such as banana leaf spot can be brought under control after the primary infection has occurred.

As illustrative of a fungicide concentrate embodying and for practicing this invention, an example including 30% by weight of copper oxychloride as the fungicidal active component may be noted as comprising:

| | Parts by Weight |
|---|---|
| Kerosene | 98 |
| Mineral oil | 557 |
| Silica gel | 5 |
| Aluminum stearate | 40 |
| Copper oxychloride | 300 |

The mineral oil referred to above should be highly paraffinic and, preferably, have a maximum density at 15° C. of no more than .880 gram per cc., a Saybolt viscosity at 100° C. of about 80 to 90 seconds, a refractive index at 50° C. of about 1.8/2.1, a closed cup flash point of no more than approximately 160° C., a solidification point (A.S.T.M.) of approximately −24° C., and a sulfonization index (A.S.T.M.) of no less than about 85.

The aluminum stearate, preferably in combination with and as activated by the silica gel, is a preferred additive for thickening, viscosity control, and surface tension adjustment. It also aids in keeping the active fungicide in suspension and enhances the mechanical stability of the mixture to minimize any tendency for separation or settling out of the dispersion in use. It is also a preferred material due to its tendency to filter ultra-violet rays which may cause scorching on the foliage and increase the phytoxicity of the mixture.

A preferred aluminum stearate material comprises about 2% to 3% free stearic acid, 5% to 6% aluminum, and 11% to 12% $Al_2O_3$.

As noted, it is also preferred to include in the concentrate silica gel as an additional dispersant component for assuring that, when the final product is diluted with the spraying oil, the dispersion will not break or permit settling out of the active components, and one such satisfactory material is that manufactured by Monsanto Chemical Company designated as "Santocel C."

An active concentrate embodying and for practicing this invention and having the foregoing illustrative components is preferably manufactured by producing as a first step the aluminum stearate gel. To do this, 48 parts kerosene, 207 parts mineral oil, 5 parts silica gel and 40 parts aluminum stearate, all as above noted, are mixed together in a suitable mixing tank equipped with a turbo-agitator, and the mixture is then passed through a colloidal crusher or mill to obtain fine, uniform, and satisfactory dispersion of the pulverulent components in the oil base. The milled mixture is then heated, with agitation, to a temperature of approximately 140° C. for several minutes, and then cooled as slowly as possible, preferably in an insulated tank, to obtain as completely homogeneous a gel as possible.

As a second stage in the preparation, 200 parts mineral oil and 50 parts kerosene are admixed and part of the mixture poured into a mixing tank equipped with a turbo-agitator placed 3 to 4 centimeters from the bottom of the tank. With agitation, 300 parts of the aluminum stearate gel above described are added to the tank to achieve a relatively thick consistency, and then, with continued agitation, the remainder of the aluminum stearate gel and the remainder of the above kerosene oil mixture are alternately added in small increments until all the gel has been incorporated in the 250 parts of oil-kerosene mixture.

Thereafter, the 300 parts of copper oxychloride, as finely divided as possible to avoid any blockages of the atomization sprays, is incorporated into the mixture by being spread thereover slowly with continued agitation, and, finally, the remaining 150 parts of mineral oil are added to the mixing tank.

After several minutes more of continued agitation to insure complete dispersion and admixture of all the components, the mixing tank is drained preferably through a filter and the concentrate stored or packaged for delivery.

As noted, the foregoing concentrate will maintain its uniform dispersed characteristics during shipment or storage prior to use and despite a wide range of temperatures to which it may be exposed. At the point of use, it is quite simply added to the supply tank of a spraying or fogging apparatus and diluted with the aforementioned spraying oil using approximately 1 quart (or about 1 kilogram) concentrate to 2 to 3 gallons of spraying oil per acre.

As further illustrative of compositions for embodying and practicing this invention, it is noted that the oil-gel bases of the foregoing example may also satisfactorily be used to produce a concentrate embodying fungicides or insecticides other than the above noted copper oxychloride for admixture with spraying oil for spraying application as noted. For example, ziram (zinc dimethyldithiocarbamate) fungicide, zineb (zinc ethylenebisdithiocarbamate) insecticide-fungicide, aldrin (hexachlorohexahydro-dimethanonaphthalene) insecticide, dieldrin (hexachlorepoxyoctahydro-dimethanonaphthalene) insecticide, lindane (gamma-benzene hexachloride) insecticide, parathion (diethyl-para-nitrophenyl-thiophosphate) insecticide-acracide, Paris green, D.D.T., etc., are among the various materials which can satisfactorily be embodied into concentrate compositions embodying and for practicing this invention in place of the copper oxychloride active component set forth in the above illustrated formulation.

As will be understood, compositions embodying and for practicing this invention may also employ as carriers for the desired insecticide or fungicide material various petroleum oily compounds in addition to those mentioned above such as, for example, light mineral oils, diesel oil, fuel oil, mineral spirits, etc., and, furthermore, suspensions according to this invention may also be ultimately used as emulsified in a waterspray in known manner. Although the aluminum stearate and silica gel illustrate preferred thickening and dispersing, etc., additives or components, satisfactory results are obtained according to this invention using other materials to accomplish the thickening action, surface dimension adjustment, and mechanical and stabilizing of the suspension of insecticides or fungicides in an oily base. Illustrative of such thickening, dispersing and/or surface active agents are metallic salts of organic acids such as the oleates, palmitates, ricinoleates and stearates of aluminum, cadmium, lithium, or magnesium, or mixtures thereof, as well as natural or synthetic waxes, hydrogenated, oxidized, or sulfated oils, natural latex, polyethylene, polyisoethylene, organic salts of acrylic or methacrylic acid, organic salts of bentonite, or pure or colloidal silica. Particularly when the compositions are desired to be prepared for an emulsifiable water base spray, satisfactory results are achieved by utilizing known emulsifiers, dispersants, and surface active agents to obtain a stable emulsion, such as ionic, non-ionic, or cationic emulsifiers, ethylene oxide condensation, products, methylcellulose, carboxymethylcellulose, oxyethylcellulose, polyvinyl alcohol, basic salts of acrylic or methacrylic acid, alginates, casein, and amylaceous products in addition to the materials above mentioned. Obviously, additional light and heat, protecting agents, oxidizing agents, ultra-violet absorption agents, etc., may also be included in known manner.

Accordingly, it will be seen that compositions embodying and for practicing this invention are provided to obtain satisfactory and optimum dispersion and suspension of active fungicide, insecticide, or anti-parasite ingredients in a spraying oil for spray or fog application to trees, plants, and the like, in the form of a concentrate which can be satisfactorily admixed with the spraying oil at the site of treatment to produce a sprayable mixture having surface tension and other characteristics adapted to produce upon atomization by conventional spraying and fogging apparatus a fog or cloud of droplets within a predetermined optimum size range and distribution for drift spraying of trees or plants over a large area.

In this specification are described a preferred embodiment of the invention and various modifications thereof, but it is to be understood that these are not intended to be exhaustive or limiting of the invention but, on the contrary, are given for purposes of illustration in order that others skilled in the art may fully understand the invention and the principles thereof and the manner of applying it in practical use so that they may modify and adapt it in various forms, each as may be best suited to the conditions of a particular use.

We claim:
1. An oily base concentrate for admixture into an oil plant spray to include therein a dispersed anti-parasite agent and comprising a mixture of kerosene and mineral oil, an aluminum stearate gel, and silica gel.
2. An oily base concentrate for admixture into an oil plant spray to include therein a dispersed anti-parasite agent and comprising a mixture of kerosene and mineral oil, aluminum stearate, silica gel, and including uniformly and stably dispersed therein said anti-parasite agent in finely divided form.
3. An oily base concentrate for admixture into an oil plant spray to include therein a dispersed fungicidal agent and comprising a mixture of kerosene and mineral oil, aluminum stearate, silica gel, and including uniformly and stably dispersed therein said fungicidal agent in finely divided form.
4. An oily base concentrate for admixture into an oil plant spray to include therein a dispersed insecticidal agent and comprising a mixture of kerosene and mineral oil, an aluminum stearate gel, silica gel, and including uniformly and stably dispersed therein said insecticidal agent in finely divided form.

References Cited in the file of this patent
UNITED STATES PATENTS

| 2,089,612 | Kobelka | Aug. 10, 1937 |
| 2,547,261 | Geiger | Apr. 3, 1951 |
| 2,599,373 | Chrzanowski | June 3, 1952 |

OTHER REFERENCES

Merck Index, 6th edition, Merck and Co., Rahway, N.J., 1952, page 44.

"Santocel," Monsanto Chemical Co., St. Louis, Mo., 1956, pages 1–10.

Handbook of Aldrin, Dieldrin and Endrin, Shell Chemical Corp., New York, N.Y., 1954, pages 9–17.